US009452378B2

United States Patent
Jackson

(10) Patent No.: US 9,452,378 B2
(45) Date of Patent: Sep. 27, 2016

(54) APPARATUS AND METHOD FOR REGULATING FILTER MEDIA PACK PLEAT SPACING

(71) Applicant: American Air Filter Company, Inc., Louisville, KS (US)

(72) Inventor: Paul Jackson, North Shields (GB)

(73) Assignee: American Air Filter Company, Inc., Louisville, KY (US)

( * ) Notice: Subject to any disclaimer, the term of this patent is extended or adjusted under 35 U.S.C. 154(b) by 201 days.

(21) Appl. No.: 14/522,812

(22) Filed: Oct. 24, 2014

(65) Prior Publication Data

US 2015/0113929 A1    Apr. 30, 2015

Related U.S. Application Data

(60) Provisional application No. 61/895,585, filed on Oct. 25, 2013.

(51) Int. Cl.

| | |
|---|---|
| *B01D 46/52* | (2006.01) |
| *B01D 46/00* | (2006.01) |
| *B01D 46/54* | (2006.01) |
| *B32B 37/12* | (2006.01) |
| *B32B 38/00* | (2006.01) |
| *B01D 46/24* | (2006.01) |

(52) U.S. Cl.
CPC ......... *B01D 46/523* (2013.01); *B01D 46/0001* (2013.01); *B01D 46/0024* (2013.01); *B01D 46/2411* (2013.01); *B01D 46/543* (2013.01); *B32B 37/1292* (2013.01); *B32B 38/0012* (2013.01); *B01D 2275/10* (2013.01); *Y10T 156/1051* (2015.01)

(58) Field of Classification Search
CPC .......... B01D 46/0001; B01D 46/0024; B01D 46/0026; B01D 46/2411; B01D 46/523; B01D 46/543; B01D 2265/06
See application file for complete search history.

(56) References Cited

U.S. PATENT DOCUMENTS

| | | | |
|---|---|---|---|
| 3,692,184 A * | 9/1972 | Miller, Jr. ............ | B01D 29/111 210/437 |
| 4,522,719 A | 6/1985 | Kuwajima et al. | |
| 4,769,096 A | 9/1988 | Vander Giessen et al. | |
| 4,890,444 A | 1/1990 | Vander Giessen et al. | |
| 5,753,071 A | 5/1998 | Spencer | |
| 6,102,978 A * | 8/2000 | Butler ................ | B01D 46/0067 156/556 |
| 6,579,337 B2 | 6/2003 | Heilmann et al. | |

(Continued)

FOREIGN PATENT DOCUMENTS

JP    2009195842    9/2009

OTHER PUBLICATIONS

Korean Intellectual Property Office, International Search Report, Jan. 29, 2015, pp. 1-8, Korean Intellectual Property Office, Daejeon Metropolitan City, Republic of Korea.

*Primary Examiner* — Robert Clemente
(74) *Attorney, Agent, or Firm* — Middleton Reutlinger; John F. Salazar; Chad D. Bruggeman

(57) ABSTRACT

Apparatus and method related to a cartridge filter having self-regulated pleat spacing. An elastic adhesive bead is used on an outer surface of a cylindrically formed pleated filter media to maintain pleat spacing without damaging the pleats or the filter media. In this way, a cylindrical pleated filter media may be formed from a planar filter media without the need for manually spacing the pleats during or after formation into a cylinder.

23 Claims, 4 Drawing Sheets

(56) References Cited

U.S. PATENT DOCUMENTS

| | | |
|---|---|---|
| 6,991,673 B2 | 1/2006 | Wastijn et al. |
| 7,661,540 B2 | 2/2010 | Choi |
| 7,874,431 B2 * | 1/2011 | Eisengraeber-Pabst .................. B01D 29/111 210/493.1 |
| 7,959,701 B2 | 6/2011 | Merritt |
| 2005/0284116 A1 | 12/2005 | Duffy |
| 2006/0277880 A1 | 12/2006 | Attassery |
| 2007/0277488 A1 * | 12/2007 | Eisengraeber-Pabst .................. B01D 29/111 55/521 |
| 2009/0200228 A1 * | 8/2009 | Eisengraber-Pabst .................. B01D 29/111 210/493.5 |
| 2012/0073254 A1 | 3/2012 | Konno et al. |

* cited by examiner

APPARATUS AND METHOD FOR REGULATING FILTER MEDIA PACK PLEAT SPACING

CROSS-REFERNCE TO PRIOR APPLICATION

This nonprovisional application claims priority to and benefit under 35 U.S.C. 119(e) to currently pending U.S. Provisional Application No. 61/895,585, filed Oct. 25, 2013, which is incorporated by reference in its entirety.

TECHNICAL FIELD

Generally, a pleated filter for use in a canister style filter is taught. More specifically, present embodiments relate to a cylindrical pleated filter media having an elastic, or stretchable, adhesive on an outer surface to maintain pleat spacing.

BACKGROUND

Product development and testing of pleated filter media have indicated that pleat spacing is paramount to obtain optimum product performance in some applications, for example, where pleated filter media used in gas turbine cartridge filters. To ensure a low pressure loss across a filter, the entry and exit losses generally need to be minimized, which may be accomplished by maintaining adequate pleat spacing between adjacent pleats to prevent pleat-to-pleat contact (or "breaching"). Some filter media types, such as those that are not pre-corrugated or cannot be processed with an embossed pleat spacing feature, may rely on beads of hotmelt adhesive being applied during the media conversion into pleated form to maintain a uniform spacing. In cartridge style filters, a single grade of hotmelt adhesive is often applied either in a continuous or intermittent bead formation to one surface only of the filter media. Once formed into the cartridge, a spiral melt hotmelt bead or a spacing band may be applied to the outer surface to stabilize the pleats. However, the aforementioned assembly techniques often require manual intervention to evenly space the pleats. Such manual intervention may prove extremely costly and/or time consuming.

Applying adhesive beads to both surfaces of a pleated filter media is acceptable on some filter styles, such as flat panel or vee bank style filters, for example. However, applying adhesive beads to both surfaces of a pleated filter media, and then attempting to form it into a cylindrical or cartridge style filter, may cause strain between the adhesive bead and the filter media, especially at the outer circumference. As the filter media is formed into a cylindrical or conical shape, the strain leaves the filter media susceptible to damage and/or loss of filter integrity. The risk of damage is worsened with an increase in pleat depth.

Thus, there is a need in the art for overcoming the issues of existing systems.

SUMMARY

The present disclosure is directed towards filter apparatus and methods of constructing a filter. The filter is, in various embodiments, pleated with one or more adhesive beads that may encourage self-regulation of the pleat spacing. These one or more adhesive beads may be disposed across a surface of the filter that forms an outer surface or in-flow surface of the filter, and may be stretchable enough to maintain the pleat spacing when the filter is transformed from a planar form to a cylindrical form.

Generally, in one aspect, a cartridge filter with self-regulated pleat spacing is provided including a cylindrical pleated filter media. The filter media has a plurality of pleats extending lengthwise and arranged side by side so as to form a series of alternating pleat tips and pleat valleys. The cartridge filter includes a cylindrical inner screen. The pleated filter media has an inner surface and an outer surface, and the inner surface is adjacent the inner screen. There is at least one first adhesive bead applied to the inner surface of the filter media, and this bead traverses a plurality of the pleat tips and pleat valleys. There is also at least one second adhesive bead applied to the outer surface of the pleated filter media. This second adhesive bead or beads at least partially encircles the filter media. The second adhesive bead or beads has greater elasticity than the first adhesive bead or beads so that the second adhesive bead or beads may maintain the pleat spacing of the outer surface when the pleated filter media is transformed from a planar form to a cylindrical form. Optionally, the pleated filter media may have a plurality of filtration layers, one of these layers may optionally be a porous membrane layer or a non-woven particulate retention layer. The cartridge filter may include a cylindrical outer screen adjacent or disposed across the outer surface of the pleated filter media. The cartridge filter may include a pair of end caps, one on each of the opposite ends of the cartridge filter. The cartridge filter may include at least two second adhesive beads that are spaced apart from and substantially parallel to each other. Optionally, one or more of the adhesive beads, whether on the inner surface or outer surface of the filter media, may be continuous.

Generally, in another aspect, a cartridge filter is provided that has self-regulated pleat spacing. The cartridge filter includes a tubular pleated filter media that has a plurality of parallel pleats arranged side by side in a series of alternating tips and valleys. The cartridge filter includes a tubular inner screen. The pleated filter media has an inner filter surface adjacent the tubular inner screen and an outer filter surface that forms an outer circumference of the tubular pleated filter media. There is at least one first adhesive bead applied to the inner filter surface in a direction transverse to the longitudinal axis of the tubular pleated filter media. There is also at least one second adhesive bead applied to the outer filter surface in a spiral form and at least partially encircling the tubular pleated filter media. The second adhesive bead has greater elasticity than the first adhesive bead and the second adhesive bead inhibits breaching of the pleats on the outer surface when the tubular pleated filter media is transformed from a planar form to a tubular form. Optionally, the tubular pleated filter media may have a plurality of filtration layers, one of these layers may optionally be a porous membrane layer or a non-woven particulate retention layer. The cartridge filter may include an outer tubular screen disposed across or adjacent the outer surface of the filter media. The cartridge filter may include a pair of end caps, one on each of the opposite ends of the cartridge filter. The cartridge filter may include at least two second adhesive beads that are spaced apart from and substantially parallel to each other. Optionally, one or more of the adhesive beads, whether on the inner surface or outer surface of the filter media, may be continuous.

Generally, in another aspect, a method of constructing a cartridge filter with self-regulated pleat spacing is provided. The method includes the steps of forming a planar filter media, pleating the planar filter media, and applying a first adhesive bead to a first surface of the planar filter media. The method also includes the steps of applying a second adhesive bead, which has greater elasticity than the first adhesive bead, to the surface of the filter media that is opposite the first surface. The method further includes the step of transforming the planar filter media into a tubular shaped pleated filter media wherein the first surface of the planar filter media becomes the inner surface of the tubular filter media and the second surface of the planar filter media becomes the outer surface of the tubular filter media. Optionally, the method may include the step of attaching one side of the tubular shaped pleated filter media to another side of the tubular shaped pleated filter media. The method may include the step of attaching the tubular shaped pleated filter media to an inner screen and/or attaching an outer tube screen across the outer surface of or adjacent the tubular shaped pleated filter media. Optionally, the method may include the step of attaching a pair of end caps to the inner screen.

DETAILED DESCRIPTION

Figure 1:
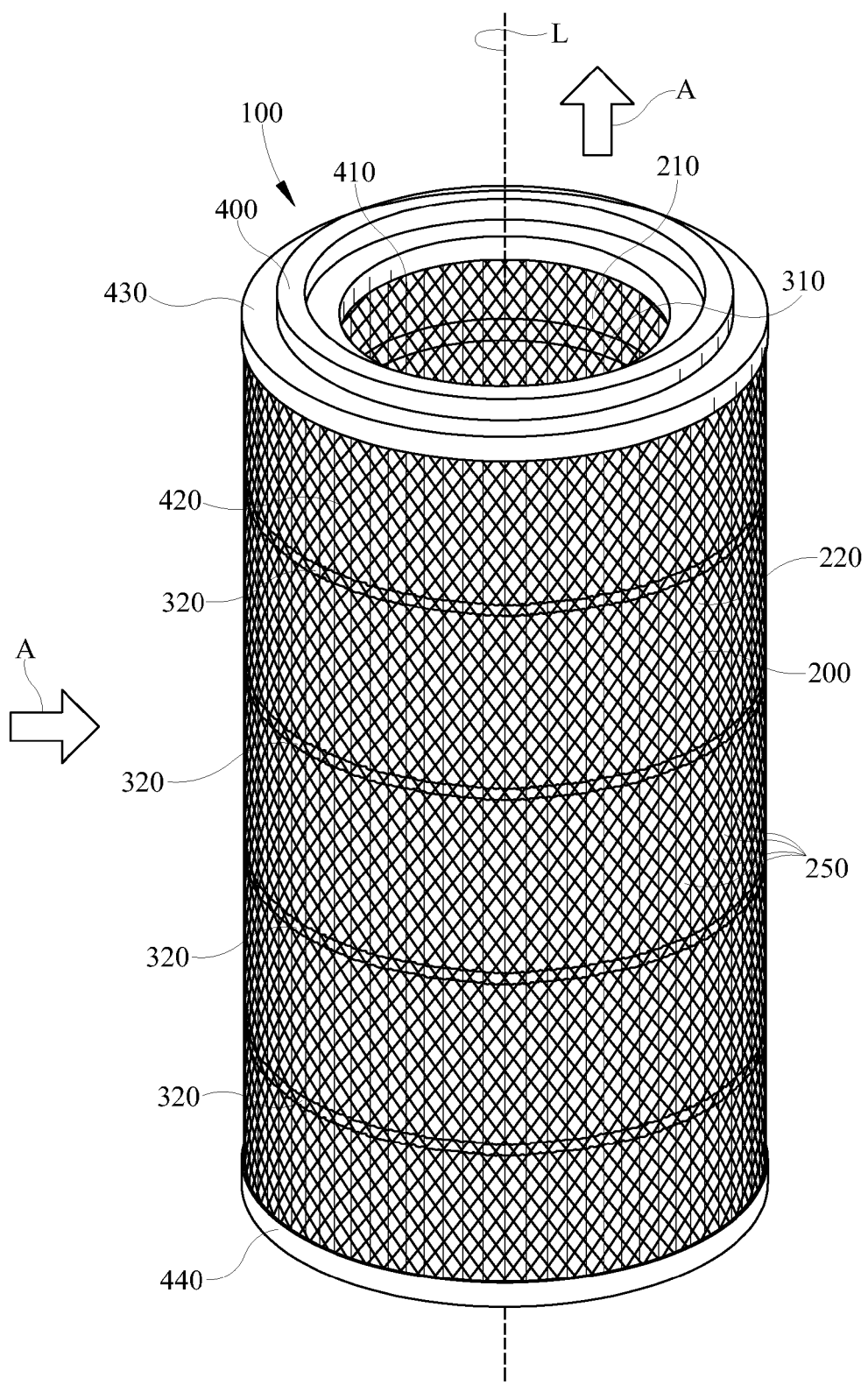
FIG. 1 is a perspective view of an embodiment of a canister filter.

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections and couplings. In addition, the terms "connected" and "coupled" and variations thereof are not restricted to physical or mechanical connections or couplings.

Referring initially to FIG. 1, a cartridge filter 100 is shown including a filter media 200 and a support structure 400. Cartridge filter 100 may be hollow and allow a fluid flow, such as an air flow A, to flow therethrough, thereby filtering air flow A or any other fluid flow flowing therethrough. Filter media 200 may be permeable to allow air flow A therethrough and/or selected from any of a variety of types, sizes, materials, and/or configurations, and may, for example, be selected to filter a specific type of fluid flow. For example, cartridge filter 100 may be used in a gas turbine engine application and filter media 200 may be selected to filter particulates and/or contaminants from air flow A. Filter media 200 may be formed of any of a variety of materials, including, but not limited to, non-woven microglass, non-woven organics or polyolefins such as polyethylene or polyester, non-woven synthetics, needle felt, spun bond, wet laid, air laid, or any other material, or a combination thereof. The type of material used to form filter media 200 does not need to be selected based on any certain type of application. Filter media 200 may be made of more than one type of material and/or more than one layer of material. For example, filter media 200 may include one or more particle retention layers formed of, for example, non-woven material, filter media 200 may include one or more porous membranes, for example, ePTFE or HMWPE, and/or filter media 200 may include one or more support or scrim layers. Multiple layers, if included, may be arranged in order, and may be attached in any of a variety of ways, including, but not limited to, adhesion materials applied between layers, melting portions of one or more layers to bond to one or more adjacent layers, stitching, intertangling, or any other attachment, connection, or coupling mechanism. It is understood that air flow A, or other flow, although illustrated as flowing in perpendicular to, and out parallel to, a longitudinal axis L of cartridge filter 100, air flow A may flow in the opposite direction or any direction and is not limited to directions that are parallel or perpendicular to longitudinal axis L. It is further understood that cartridge filter 100 may be any of a variety of shapes, including, but not limited to, cylindrical, conical, spherical, round, ovular, annular, tubular, cartridge, canister, and/or any other shape or style, or a combination thereof.

Support structure 400 may be included to protect filter media 200 and/or to help maintain the shape of filter media 200. Support structure 400 may be correspondingly shaped to filter media 200 to help protect and/or support filter media 200. For example, if filter media 200 is cylindrical, support structure 400 may also be substantially cylindrical. Support structure 400 may include or any or all of a first end cap 430, a second end cap 440, an inner screen 410, and an outer screen 420. If included, first end cap 430, second end cap 440, inner screen 410, and outer screen 420 may substantially form an enclosure around filter media 200. End caps 430, 440 may extend in a direction transverse to longitudinal axis L so as to cover the ends of any or all of inner screen 410, filter media 200, and outer screen 420. End caps 430, 440 may be disposed on opposite ends of inner screen 410, filter media 200, and/or outer screen 420, and/or may provide a mechanism for attaching, connecting, or coupling to inner screen 410, filter media 200, and/or outer screen 420. Thus, end caps 430, 440, if included, may support and/or protect filter media 200, inner screen 410, and/or outer screen 420.

Inner screen 410 and/or outer screen 420 may be substantially open, thereby allowing air flow A therethrough. The inner screen 410 and/or outer screen 420 may be, but is not limited to, cylindrical or tubular in shape. Inner screen 410 may be positioned adjacent an inner surface 210 of filter media 200. Outer screen 420 may be positioned adjacent an outer surface 220 of filter media 200. Although shown in the figures, it is understood that inner screen 410 and/or outer screen 420 may not be used. For example, some embodiments may include both screens 410, 420, some embodiments may include only inner screen 410 or alternatively only outer screen 420, and some embodiments may include neither screen 410, 420. Although not required, in some embodiments inner screen 410 and/or outer screen 420 may be more open and/or more permeable than filter media 200 so that screens 410, 420 do not inhibit air flow A more so than filter media 200. It is understood that inner screen 410 and outer screen 420 are optional and, if included, may contain a portion that is open, such as a screen or mesh, but screens 410, 420 do not need to be completely open. For example, a portion of inner screen 410 and/or outer screen 420 may be substantially closed and/or substantially impermeable to air flow A or any other flow.

Filter media 200 may be pleated and/or include a plurality of pleats 250. Pleats 250 may extend longitudinally and/or substantially perpendicular to longitudinal axis L, and/or may be arranged at a radial distance from longitudinal axis L if filter media 200 is cylindrical, spherical, or conical in shape. Pleats 250 may be arranged side by side and/or serially in a direction transverse to longitudinal direction in which pleats 250 extend. The spacing of pleats 250 may be maintained by applying one or more outer beads 320 and/or one or more inner beads 310. Outer beads 320 may be applied across outer surface 220 of filter media 200 in such a way as to traverse a plurality of pleats 250. Inner beads 310 may be applied across inner surface 210 of filter media 200 in such a way as to traverse a plurality of pleats 250. Either or both of inner surface 210 and outer surface 220 of filter media 200 may be pleated, although neither is required to be pleated. In some embodiments, inner surface 210 and outer surface 220 may be correspondingly pleated, so that pleat tips 252 (see FIGS. 2-4) are visible on outer surface 220 and pleat valleys 254 (see FIGS. 2-4) are visible on inner surface 210. Although any number of pleats 250 may be used, in some exemplary embodiments, approximately 325 pleats 250 may be used for a filter media 200 having an outer diameter of about 12.75", and/or approximately 245 pleats 250 may be used for a filter media 200 having an outer diameter of about 12.75". It is understood that these are merely examples, and any number of pleats may be included, and/or the number of pleats may be optimized, for example, for certain filtering characteristics for certain environments or applications. It is further understood that substantially all of filter media 200 may be pleated and/or include pleats 250, or that less than all of filter media 200 may be pleated and/or any portion or portions of filter media 200 may include pleats. It is also understood that the number of pleats 250 is not limited to the exact number of pleats 250 indicated by lead lines and/or reference characters in FIGS. 1-4B (e.g., the Figures actually depict substantially the entire filter media 200 being pleated, and are not limiting the number of pleats 250 to those specifically indicated by lead lines).

Inner bead or beads 310 and/or outer bead or beads 320 may be substantially linear and/or perpendicular to longitudinal axis L, and/or located in a plane substantially perpendicular to longitudinal axis L. Outer beads 320 may substantially encircle, substantially entirely or partially, outer surface 220 when in tubular or cylindrical form. It is understood that the term "encircle" or variations thereof, such as "encircling" is not limited to mean literally forming a circle, although it may include forming a circle, but may also include entirely or partially forming a perimeter around, entirely or partially surrounding, and/or being located at near an entire or partial periphery of that which is being encircled. In some embodiments, any or all of inner beads 310 and/or outer beads 320 may lie in a plane that is oriented at an acute or at an obtuse angle relative to longitudinal axis L. For example, some embodiments may include one or more inner beads 310 and/or one or more outer beads 320 that form a spiral or helix about longitudinal axis L, whether cartridge filter 100 is cylindrical or shaped otherwise. In such embodiments, a single inner bead 310 and/or a single outer bead 320 may be spirally and/or helically disposed across inner surface 210 or outer surface 220, respectively. A single bead 310, 320 may be continuous or substantially unbroken, or a single bead 310, 320 may be discontinuous or intermittent. Thus, for example, a single bead 310, 320 may be applied in a pattern of one or more alternating areas of application and non-application across respective filter media surface 210, 220 (forming what might be depicted as a dashed line). It is understood that any or all of inner beads 310 and outer beads 320 may be oriented independently of any other bead 310, 320. If multiple beads 310, 320 are used, inner beads 310 may be spaced apart on inner surface 210, and/or outer beads 320 may be spaced apart on outer surface 220. For example, in some embodiments, the inner beads 310 may be spaced 2" apart and/or the outer beads 320 may be spaced 2" apart. It is understood that any number of inner beads 310 may be on inner surface 210 and/or any number of outer beads 320 may be on outer surface 220. It is further understood that the size of beads 310, 320 is virtually unlimited, but in some exemplary embodiments, beads 310, 320 may be approximately 2.5 mm thick.

Figure 2:
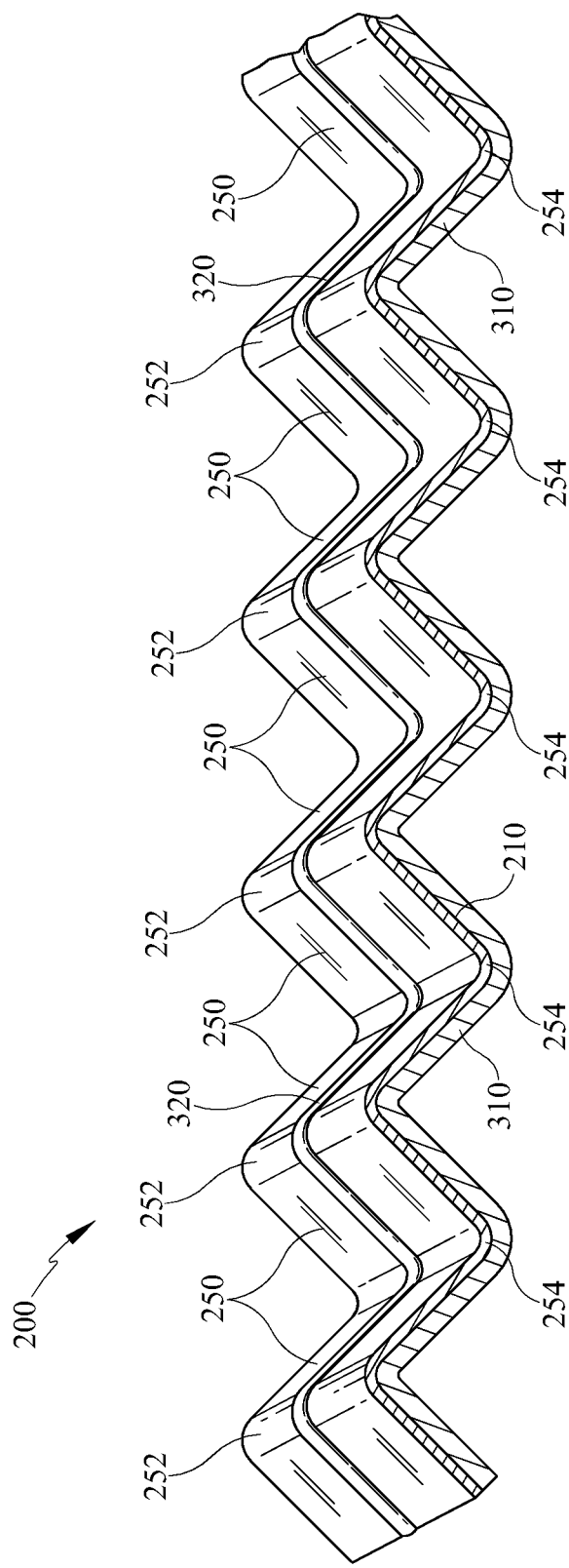
FIG. 2 is a perspective view of an embodiment of a portion of a pleated filter media.

Referring now to FIG. 2, a portion of filter media 200 is shown in planar form (instead of in cylindrical or annular form, as shown in FIG. 1). In some embodiments and/or applications, filter media 200 may be first pleated and/or formed in planar form, as shown in FIG. 2, and subsequently formed into a tube, cylinder, cartridge, canister, or other shape or style. For example, in some embodiments and/or applications, it may be efficient to form filter media 200 into a rectangular planar form, pleat it, apply inner beads 310 and/or outer beads 320, and bend or form filter media 200 into a tubular, cylindrical, cartridge, canister or other form. During shaping from a pleated planar form to a cylindrical, tubular, or other form as described herein, outer beads 320 located on outer surface 220 of filter media 200 may be placed in tension and/or inner beads 310 located on inner surface 210 may be placed in compression. In order to maintain filter media 200 in its selected shape, and/or to facilitate the formation to that shape from a substantially pleated planar form without damaging the pleats 250 or varying the spacing of the pleats 250, inner bead or beads 310 may be relatively rigid compared to outer bead or beads 320, which may be relatively elastic and/or stretchable compared to inner bead or beads 310. The outer bead or beads 320 may exhibit a greater elasticity than inner bead or beads 310. By greater elasticity, it is meant that outer bead 320 has a greater ability to be stretched, and optionally return to or approach its original shape, before structural or functional failure as compared to inner bead 310. An example of structural failure includes, but is not limited to, causing a break or discontinuity in outer bead 320 that was not present before transforming filter media 200 from planar form to cylindrical or tubular form. An example of functional failure includes, but is not limited to, causing outer bead 320 to lack adhesiveness to the point that it no longer adheres to filter media 200. The relative elasticity, or ability to be stretched, of outer bead or beads 320 may be achieved in any of a variety of ways. For example, outer beads 320 may be formed of a material that is characteristically more elastic than inner beads 310, outer beads 320 may be less thick than inner beads 310, thereby allowing more stretching and/or having less tensile strength, and/or outer beads 320 may be set (such as by applying heat) for less time than inner beads 310 and/or outer beads 320 may be formed of a material having a longer set time than inner beads 310 thereby being more elastic than inner beads 310 after a given set time has elapsed. It is understood that these are merely examples and any of a variety of mechanisms, materials, or methods may be used to achieve one or more outer beads 320 that are relatively more elastic than one or more inner beads 310. Thus, although inner beads 310 are depicted in FIG. 2 as substantially thicker than outer beads 320, it is understood that any or all beads 310, 320 may be about the same thickness, or any or all of outer beads 320 may be thicker than any or all of inner beads 310.

Figure 3:
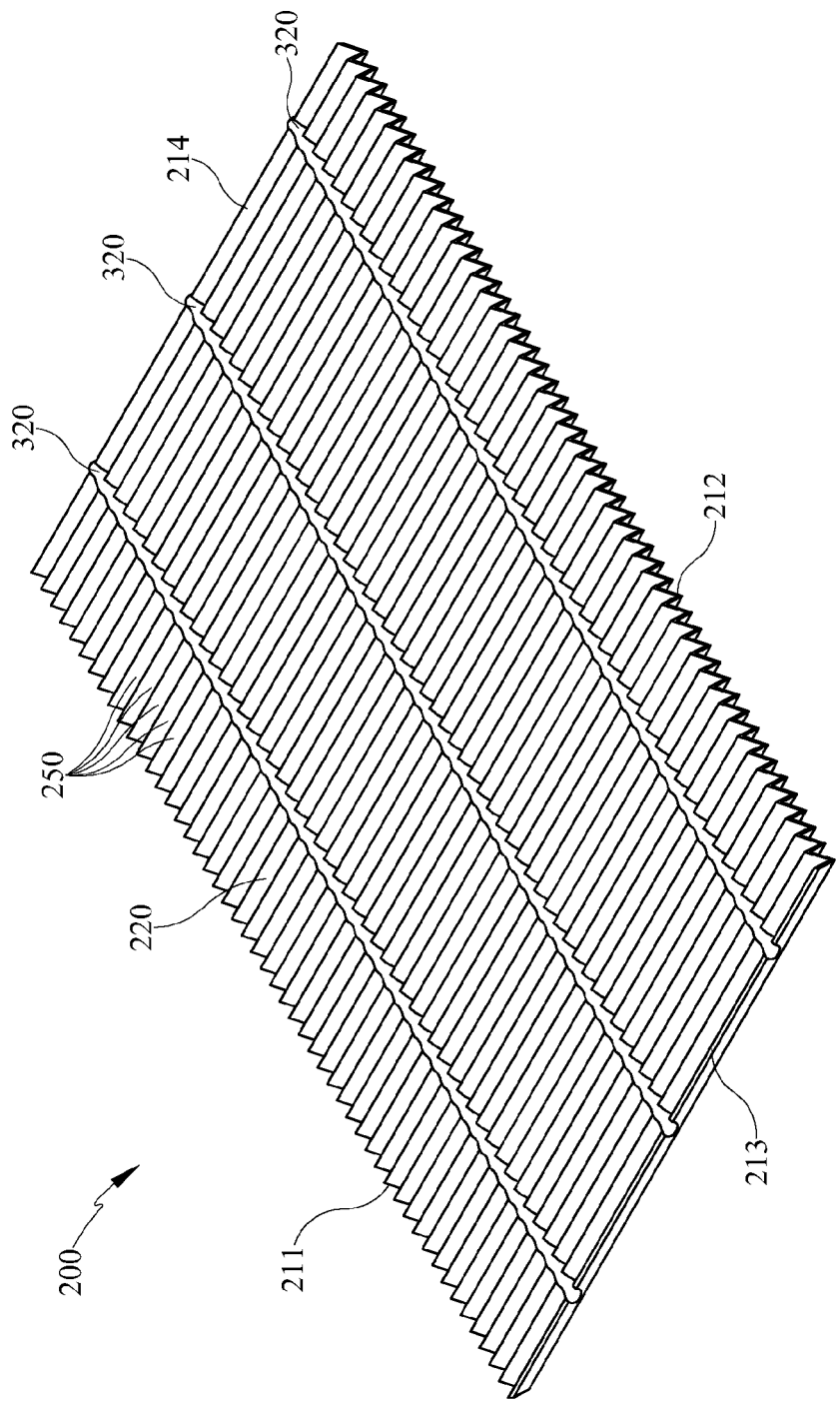
FIG. 3 is a perspective view of the pleated filter media of FIG. 2.

Referring now to FIG. 3, filter media 200 is shown in a substantially rectangular planar form and having pleats 250. Three outer beads 320 are shown applied across outer surface 220 from a first side 213 to a second side 214 of filter media 200. It is understood that any number of outer beads 320 may be present, and the presence of three is merely one example. Filter media 200 may also extend from a first end 211 to a second end 212 in substantially the same directions as pleats 250 extend. Thus, when formed into a tubular, cylindrical, cartridge, canister, or other shape as described herein, filter media 200 may extend from first end 211 to second end 212 in a direction substantially parallel to longitudinal axis L (shown in FIG. 1). One or more outer beads 320 and/or one or more inner beads 310 may be applied in any of a variety of ways to filter media 200, such as, for example, by hand or by machinery, which may be automated. In some embodiments, filter media 200 may be pleated and caused to move transversely relative to one or more glue guns, glue heads, or glue nozzles, to apply one or more beads 310, 320 substantially transverse, or in a direction from first side 213 to second side 214 (or vice versa).

Figure 4A:
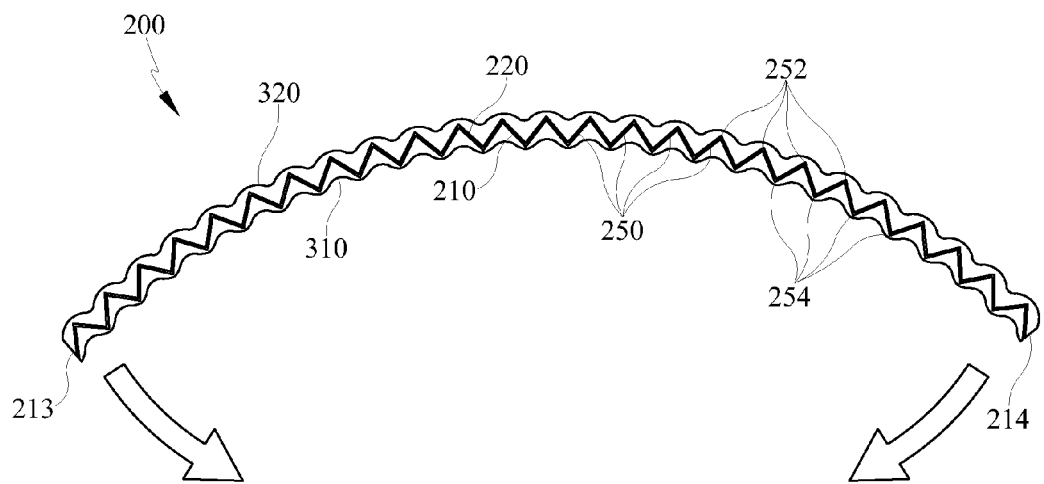
FIG. 4A is a top view of an embodiment of a pleated filter media being bent from a planar configuration to an arcuate configuration.
Figure 4B:
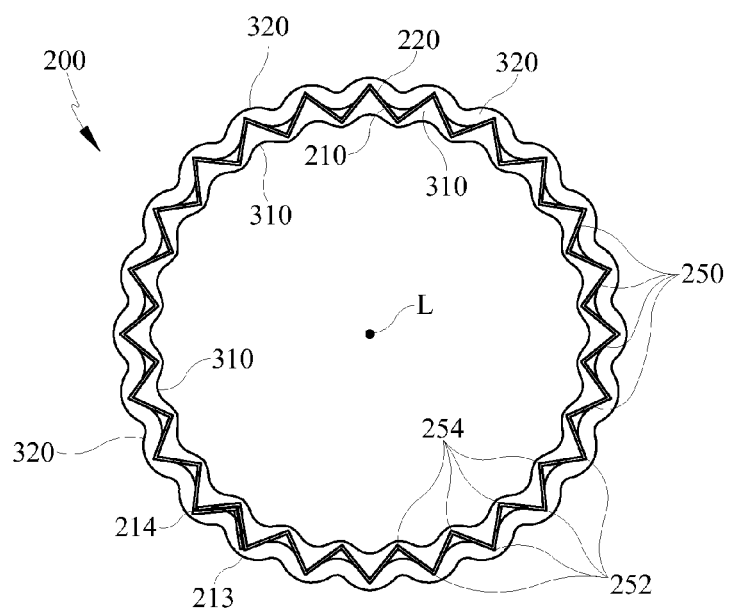
FIG. 4B is a top view of the pleated filter media of FIG. 4A in a cylindrical configuration.

Referring now to FIGS. 4A and 4B, filter media 200 is shown in a curved, partially cylindrical form (FIG. 4A) and in a final cylindrical form about longitudinal axis L (FIG. 4B). Filter media 200 may be bent or curved, such as, for example as shown by the arrows in FIG. 4A, so that first side 213 approaches second side 214. During this transition, inner bead 310 may be compressed and/or outer bead 320 may be in tension. Thus, outer bead 320 may stretch or elongate so as to allow the transition of filter media 200 from a pleated planar form to a pleated cylindrical or tubular form without inadvertently breaking outer bead 320, inadvertently varying the spacing of pleats 250, and/or causing pleats 250 to breach (e.g., adjacent pleats 250 coming into contact with one another thereby inhibiting air flow A therethrough and/or otherwise negatively impacting the operability or efficiency of filter media 200). In some embodiments, one or more pleats 250 may overlap at a portion of filter media 200 in its tubular, cylindrical, canister, or cartridge form. For example, first side 213 may extend beyond second side 214 so that one or more pleats 250 overlap. This overlapping portion, if included, may be used to adhere, attach, connect, or couple filter media 200 into its desired form. It is understood that first side 213 and second side 214 need not overlap, and/or any of a variety of other methods of attachment, connection, or coupling may be used instead of, or in addition to, that just described. For example, first side 213 may be adhered, glued, bonded, stitched, stapled, sewn, or otherwise attached, connected, or coupled directly to second side 214. Alternatively, an intermediate device, apparatus, or mechanism may be used so that first side 213 and second side 214 are indirectly attached, connected, or coupled together. It is understood that any of a variety of portions of filter media 200 may be attached, connected, or bonded to any of a variety of portions of filter media 200 to secure it, attach it, connect it, or couple it to itself. It is further understood that more than one filter media 200 may be used by, for example, connecting, attaching, coupling, bonding, and/or securing more than one filter media 200 together into a final desired form. For example, two filter media 200 may be formed into half or semi-cylindrical portions and connected, attached, coupled, or bonded together to form one cylindrical filter media 200.

Filter media 200, once formed, such as for example substantially as a cylinder depicted in FIG. 4B, filter media 200 may be combined with support structure 400 to form cartridge filter 100 (e.g., as shown in FIG. 1). For example, inner screen 410, if included may be inserted into, installed on, or otherwise connected, attached or coupled with second end cap 440 (e.g., by adhering, gluing, resin, epoxy, epoxy resin, bolting, nailing, screwing, or any other form of attachment, coupling, or connection). Filter media 200, in cylindrical form, may be inserted or installed over inner screen 410 until second end 212 of filter media 200 abuts and/or is adjacent to second end cap 440. Filter media 200 may be connected, attached, coupled, or bonded to inner screen 410 and/or second end cap 440 in any of a variety of ways (e.g., by adhering, gluing, resin, epoxy, epoxy resin, bolting, nailing, screwing, or any other form of attachment, coupling, or connection). Outer screen 420, if included, may be inserted or installed over filter media 200, such as for example, by the methods or mechanisms of connection, attachment, coupling, or bonding described herein. First end cap 430 may be connected, attached, coupled, or bonded to inner screen 410, filter media 200, and/or outer screen 420, for example, by any of the means or mechanisms of connection, attachment, coupling, or bonding described herein. It is understood that first end cap 430, second end cap 440, inner screen 410, and outer screen 420 are optional features of cartridge filter 100. Inner bead 310 and/or outer bead 320 may be applied to filter media 200 in such a way as to protect pleats 250. For example, inner bead or beads 310 may cover a portion of any or all pleat valleys 254 and/or outer bead or beads 320 may cover a portion of any or all pleat tips 252, respectively, to prevent or inhibit pleats 250 from rubbing or contacting inner screen 410 and/or outer screen 420, which may cause chafing or fraying of filter media 200 and/or decrease the operating life of filter media 200.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a"

and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. A cartridge filter with self-regulated pleat spacing, comprising:
    a cylindrical pleated filter media having a plurality of pleats;
    said plurality of pleats extending in a longitudinal direction, said pleats arranged side by side in a transverse direction, said plurality of pleats having a series of alternating pleat tips and pleat valleys in said transverse direction;
    a cylindrical inner screen;
    said pleated filter media having an inner filter surface and an outer filter surface, said inner filter surface adjacent said inner screen;
    at least one first adhesive bead applied to said inner filter surface, said first adhesive bead traversing a plurality of said pleat tips and said pleat valleys;
    at least one second adhesive bead applied to said outer filter surface, said at least one second adhesive bead at least partially encircling said pleated filter media; and
    said at least one second adhesive bead having greater elasticity than said at least one first adhesive bead, said at least one second adhesive bead maintaining pleat spacing of said outer surface when said cylindrical pleated filter media is transformed from a planar form to said cylindrical pleated filter media.

2. The cartridge filter of claim 1 wherein said pleated filter media further comprises a plurality of filtration layers.

3. The cartridge filter of claim 2 wherein at least one of said plurality of filtration layers is a porous membrane layer.

4. The cartridge filter of claim 2 wherein at least one of said plurality of filtration layers is a non-woven particulate retention layer.

5. The cartridge filter of claim 1 further comprising a cylindrical outer screen adjacent said outer filter surface.

6. The cartridge filter of claim 5 further comprising a pair of end caps disposed on opposite ends of said cartridge filter.

7. The cartridge filter of claim 1 further comprising a pair of end caps disposed on opposite ends of said cartridge filter.

8. The cartridge filter of claim 1 wherein said at least one second adhesive bead includes at least one additional second adhesive bead, wherein said at least one second adhesive bead and said at least one additional second adhesive bead are substantially parallel and spaced apart from each other.

9. The cartridge filter of claim 1 wherein at least one adhesive bead of said at least one first adhesive bead and said at least one second adhesive bead is continuous.

10. A cartridge filter with self-regulated pleat spacing, comprising:
    a tubular pleated filter media having a longitudinal axis and a plurality of pleats;
    said plurality of pleats extending longitudinally approximately parallel to said longitudinal axis, said plurality of pleats having a series of alternating tips and valleys arranged transverse to said longitudinal axis;

a tubular inner screen;

said pleated filter media having an inner filter surface and an outer filter surface, said inner filter surface adjacent said tubular inner screen, said outer filter surface forming an outer circumference of said pleated filter media;

at least one first adhesive bead applied to said inner filter surface, said first adhesive bead extending in a direction transverse to said longitudinal axis;

at least one second adhesive bead applied to said outer filter surface, said second adhesive bead at least partially encircling said tubular pleated filter media in a spiral form; and said at least one second adhesive bead having greater elasticity than said at least one first adhesive bead, said second adhesive bead inhibiting breaching of said plurality of pleats on said outer surface when said tubular pleated filter media is transformed from a planar form to said tubular pleated filter media.

11. The cartridge filter of claim 10 wherein said tubular pleated filter media further comprises a plurality of filtration layers.

12. The cartridge filter of claim 11 wherein at least one of said plurality of filtration layers is a porous membrane layer.

13. The cartridge filter of claim 11 wherein at least one of said plurality of filtration layers is a non-woven particulate retention layer.

14. The cartridge filter of claim 10 further comprising a tubular outer screen adjacent said outer filter surface.

15. The cartridge filter of claim 14 further comprising a pair of end caps disposed on said longitudinal axis on opposite ends of said cartridge filter.

16. The cartridge filter of claim 10 further comprising a pair of end caps disposed on said longitudinal axis on opposite ends of said cartridge filter.

17. The cartridge filter of claim 10 wherein said at least one second adhesive bead includes at least one additional second adhesive bead, wherein said at least one second adhesive bead and said at least one additional second adhesive bead are substantially parallel and spaced apart from each other.

18. The cartridge filter of claim 10 wherein at least one adhesive bead of said at least one first adhesive bead and said at least one second adhesive bead is continuous.

19. A method of constructing a cartridge filter with self-regulated pleat spacing, comprising the steps of:

forming a planar filter media;

pleating said planar filter media;

applying a first adhesive bead to a first surface of said planar filter media;

applying a second adhesive bead to a second surface of said planar filter media, said second surface opposite said first surface, wherein said second adhesive bead has greater elasticity than said first adhesive bead; and transforming said planar filter media into a tubular shaped pleated filter media wherein said first surface of said planar filter media becomes an inner surface of said tubular shaped pleated filter media and said second surface of said planar filter media becomes an outer surface of said tubular shaped pleated filter media.

20. The method of claim 19 further comprising the step of attaching a first portion of said tubular shaped pleated filter media located at or near a first side of said tubular shaped pleated filter media to a second portion of said tubular shaped pleated filter media located at or near a second side of said tubular shaped pleated filter media.

21. The method of claim 19 further comprising the step of attaching said tubular shaped pleated filter media to an inner screen.

22. The method of claim 21 further comprising the step of attaching an outer screen adjacent said outer surface of said tubular shaped pleated filter media.

23. The method of claim 21 further comprising the step of attaching a pair of end caps to said inner screen.

* * * * *